Sept. 12, 1967  O. HENDRICKSON  3,340,610
PORTABLE CUTTING, SLITTING AND DRILLING MACHINE
Filed Nov. 16, 1964  2 Sheets-Sheet 1
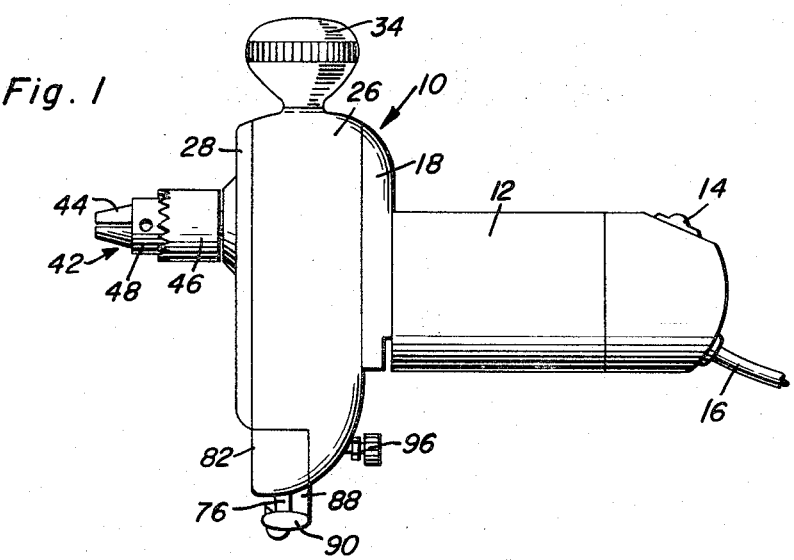
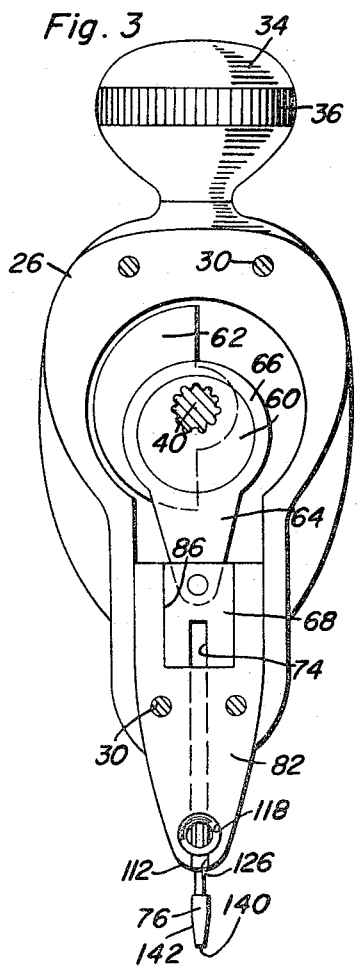
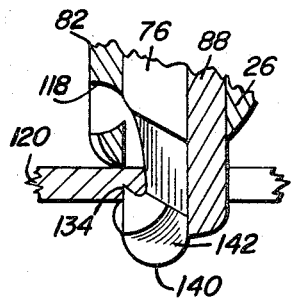
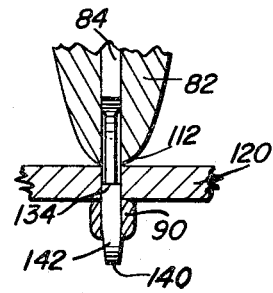
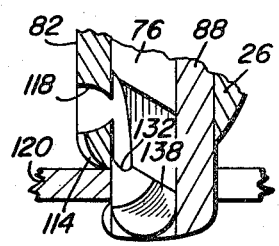
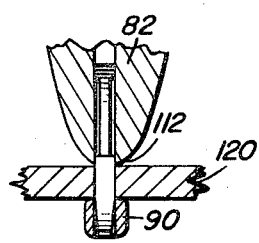
Otto Hendrickson
INVENTOR.
BY
Attorneys Sept. 12, 1967     O. HENDRICKSON     3,340,610

PORTABLE CUTTING, SLITTING AND DRILLING MACHINE

Filed Nov. 16, 1964     2 Sheets-Sheet 2

Otto Hendrickson
INVENTOR.

BY *Clarence A. O'Brien*
*and Harvey B. Jacobson*
Attorneys

United States Patent Office 3,340,610
Patented Sept. 12, 1967

3,340,610
PORTABLE CUTTING, SLITTING AND DRILLING MACHINE
Otto Hendrickson, Azusa, Calif. (P.O. Box 5316, Canyon Crest Station, Riverside, Calif. 92507)
Filed Nov. 16, 1964, Ser. No. 411,278
8 Claims. (Cl. 30—123)

The present invention generally relates to a portable power tool and more particularly to such a tool for cutting, slitting and drilling.

An object of the present invention is to provide a portable cutting, slitting and drilling machine having a reciprocating cutter blade driven by a motor having a rotary output shaft together with a mechanism interconnecting the motor output shaft and the cutter blade for reciprocating the cutter blade. The cutter blade has a specific construction and relationship to a cutter bar whereby the cuts are made upwardly against a solid cutter bar thereby providing a neat and clean cut without unnecessary and excessive strain on supporting parts.

Another object of the present invention is to provide a machine for cutting in accordance with the preceding object in which fractions or portions of the material being cut can be removed from the edge of the cut due to the side and front cutting action of the cutting blades whereby the device of the present invention may be used as an edge trimmer if desired.

A further important object of the present invention is to provide a portable cutting, slitting and drilling machine having a cutting element which is so constructed that it will initially pierce the material being cut thus requiring less power to operate the cutter. After initially piercing the material, the cutter will shear along side edges so that uniform chips will be cut out during reciprocation of the cutter.

Yet another object of the present invention is to provide a cutting device in accordance with the preceding objects which initially pierces, then shears back along the sides and the cutting operation terminates in a final shear action which causes the body of the cutter machine to move forward. While doing this, the blade is reciprocated at high speed and the blade is already taking another bite and every bite the blade takes, the machine moves forward toward the cut thereby producing a forward moving cutting action which leaves a clean cut in that the cutting edges also provide a deburring action which deburs the cut as the cutter progresses thus leaving smooth edges on both sides of the cut. In addition, there is a foot disposed under the material being cut which is adjustable for receiving different thicknesses of stock to be cut and this foot aids in enabling the blade to return through the cut without forcing the machine up out of the cut thus producing a smooth operation for the machine. The foot also has an undercut which permits the cutting machine to cut in smooth curves. The particular construction of the adjustable foot enables clean cuts to be made on various materials such as veneer, laminated wood panels or the like without tearing the wood grain due to the controlled thickness between the adjustable foot and cutter bar.

Yet another feature of the present invention is to provide a cutting machine having a drill chuck at the front surface thereof for drilling holes which aids in getting the machine free if the cutter blade is run into tough or hard material in that the cutter can be reversed by manually grasping the chuck and turning it in an opposite direction to its normal direction of rotation such as turning it in a counter-clockwise direction.

Another important object of the present invention is to provide a portable cutting, slitting and drilling machine which is simple in construction, efficient in operation, long lasting and dependable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the portable cutting, slitting and drilling machine of the present invention;

FIGURE 3 is a sectional view taken substantially upon a plane passing along section line 3—3 of FIGURE 2 illustrating further structural details of the reciprocating mechanism for the cutter assembly;

FIGURES 4–9 are detailed sectional views illustrating the construction of the cutter and the cutter mechanism in its various stages of operation during a cutting cycle;

Figure 2:
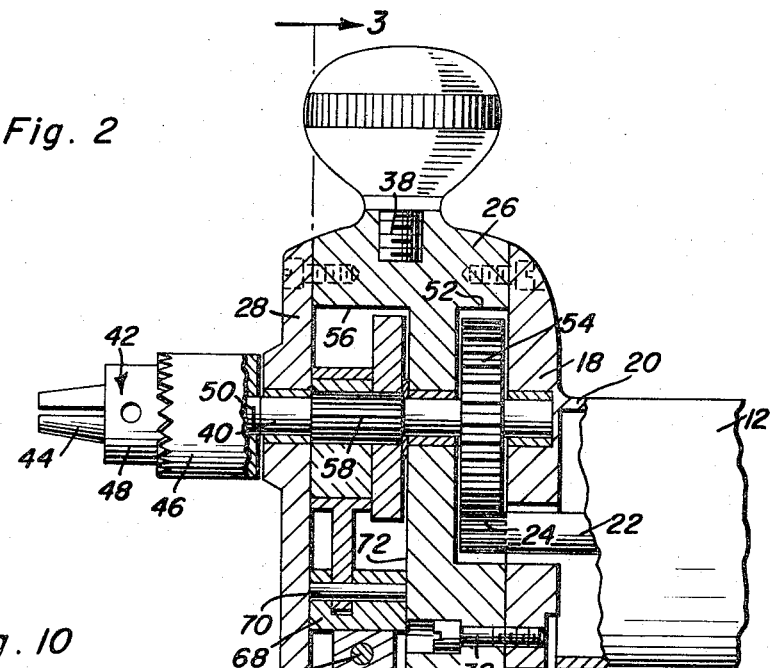
FIGURE 2 is a vertical sectional view taken through the center of the cutting mechanism illustrating the drive structure therefor.
Figure 10:
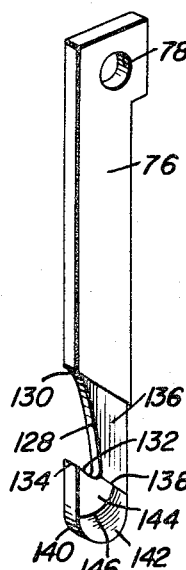
FIGURE 10 is a perspective view of the cutter element.
Figure 8:
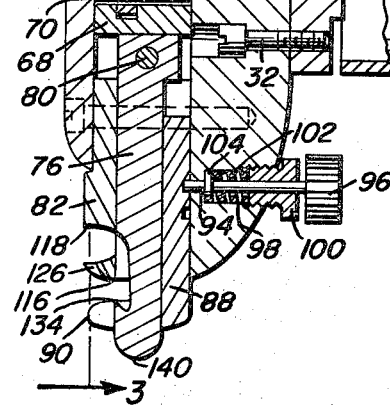
Figure 9:
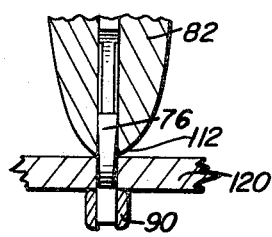

Referring now specifically to the drawings, the portable cutting, slitting and drilling machine of the present invention is generally designated by the numeral 10 and includes a portable electric motor 12 of any suitable construction such as that type of motor normally employed on a portable drill and any adequate handle structure may be incorporated therein together with a switch mechanism 14 for controlling operation of the motor and an electrical conductor 16 is attached thereto in any conventional manner for connection to a suitable source of electrical energy such as by using a male plug for inserting into a female socket. The particular construction of the electric motor may vary and the motor, of course, includes an end plate 18 of any suitable configuration and the end plate 18 may be integral with or detachably connected to an external housing 20 for the electric motor. Also, the electric motor 12 includes a power output shaft 22 extending through a suitable opening in the end plate 18 with the power output shaft 22 having a drive gear 24 mounted thereon or formed therein thus forming a motor having a power output shaft for operating the machine of the present invention. The details of the electric motor may vary and form no particular part of the present invention.

Attached to the end plate 18 is a vertically elongated housing 26 which may be in the form of a crank case having a cover plate 28 attached thereto by suitable screw-threaded fasteners 30. Also, the housing 26 is attached to the end plate 18 by similar suitable screw-threaded fasteners 32. The upper end of the housing 26 is provided with a knob 34 having a serrated peripheral portion 36 thereon. The knob 34 may be attached to the housing 26 by a screw-threaded stud 38 threaded into a socket in the housing 26. The knob 34 serves as a convenient means to operate and control the machine of the present invention.

Rotatably journalled in the housing 26, in the plate 18 and cover plate 28 is an elongated power shaft 40. The power shaft 40 is journalled in suitable bearings and one end thereof extends through the cover plate 28 and is connected to a drill chuck 42 having the usual gripping jaws 44 and rotatable elements 46 and 48 for opening and closing the gripping jaws 44. This chuck may be a conventional Jacobs chuck such as is used on portable drills and the chuck 42 is secured to the outer end of the power shaft 40 by any suitable detachable connection such as a screw-threaded connection 50 thus fixedly securing the drill chuck to the shaft 40 so that the shaft 40 will rotate the drill chuck or, if desired, the drill chuck may be manually rotated thus rotating the shaft 40.

The housing 26 includes a recess 52 therein receiving an enlarged gear 54 fixed to the shaft 40 and in meshing engagement with the output gear 24 on the shaft 22 of the motor 12. Thus, power will be imparted to the shaft 40 at a reduced rate through the reduction gear formed by the small pinion gear 24 and the large driven gear 54. The recess 52 which receives the gear 54 opens to the surface of the housing 26 which abuts against the end plate 18. The surface of the housing 26 which is abutted by the cover plate 28 also has a recess 56 therein which receives a splined portion 58 of the shaft 40. The splined portion 58 of the shaft 40 is drivingly connected with an eccentric member 60 which forms a crank element in that the eccentric member 60 is in the form of a solid element having an eccentrically disposed internally splined passage that is engaged on the splined portion 58 of the shaft 40 and rotates therewith with the recess 56 being sufficiently large to enable rotation of the crank 60.

Also mounted on the splined portion 58 of the shaft 40 is a counterbalance weight 62 which rotates with the eccentric 60 and counterbalances the offset weight thereof thus producing a smooth operation. The recess 56 is also sufficiently large to enable the counterbalancing weight 62 to rotate therein.

Journalled on the eccentric member 60 is a connecting rod 64 having a bearing cap 66 journalled on the eccentric crank 60. The lower end of the connecting rod 64 is pivotally connected to a reciprocating cross head 68 by a connecting pin 70. The cross head 68 is reciprocated in a vertical guide passage 72 and is guided in a vertical path of movement while the connecting rod 64 combined with the eccentric crank 60 will convert the rotary motion on the shaft 40 to reciprocating motion of the cross head 68 in a manner well known. Suitable bearing structures may be incorporated into the rotating and relatively moving components of the present invention. For example, a bronze bushing may be provided for the connecting rod where it engages the eccentric crank 60 and a suitable bearing may be provided for the connection between the connecting rod 64 and the pin 70 and between the pin 70 and the cross-head 68.

The cross-head 68 is provided with a slot or notch 74 communicating with the lower surface thereof and the slot 74 receives the upper end of a cutter 76 having an aperture 78 through the upper end thereof which receives a mounting pin, bolt or the like 80 for securing the cutter 76 to the cross-head 68 for reciprocation therewith. The cutter 76 is guided by a stationary cutter bar 82 having a vertical passageway 84 therein for slidably receiving the cutter 76. The cutter bar 82 has a configuration illustrated in FIGURE 3 and the guide surface for the side edges of the cross-head 68 are formed therein and designated by numeral 86. The stationary cutter bar is secured to the housing 26 by the lower portion of the cover plate and lower fastener elements 30 which also secure the cover plate to the housing 26. The rear portion of the groove 84 receives a vertically sliding adjustment bar 88 having spaced parallel foot elements 90 on the lower end thereof. The rear edge of the vertical slide bar 88 is provided with spaced notches 92 for receiving the inner end of a lock rod or plunger 94 that has a knurled knob 96 on the outer end thereof and which is reciprocably mounted within a bore 98 which threadedly receives an adjustment nut 100 for varying the tension on a spring 102 that has one end abuttingly engaging the adjustment nut 100 and the other end engaging a flange 104 on the plunger rod 94 thus spring biasing the plunger rod 94 into engagement with one of the notches 92 for adjustably locking the foot elements 90 in vertically adjusted position in relation to the bottom edge of the stationary cutter bar 82. As illustrated, the foot elements 90 are generally oval-shaped and provided with substantially horizontal upper surfaces 106, rounded forward or nose ends 108 and arcuately curved lower surfaces 110 as illustrated in FIGURE 11.

The lower end of the cutter bar 82 is provided with side surfaces which curve inwardly into relatively narrow lower end portions 112. Also, the rear of the cutter bar 82 curves forwardly and the front of the cutter bar 82 curves rearwardly as at 114 to form a relieved surface and also to form a cutting edge 116. Above the lower end of the cutter bar 82, there is provided a port or opening 118 for the outlet of chips. The outlet 118 communicates with the forward edge of the slot 84 and has outwardly flared wall surfaces to facilitate the outward movement of chips of the material being cut from the stock 120 as a slot 122 is formed therein.

Figure 11:
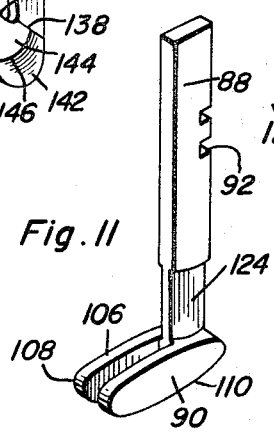
FIGURE 11 is a perspective view of the adjustable foot illustrating the manner of adjustment thereof.

As illustrated in FIGURE 11, the lower end portion of the slide bar 88 is provided with a reduced thickness area or relieved portion 124 which rides in the slot 122 and is of slightly less width than the slot 122 thus enabling the cutter to cut around curves. The relieved portion 124 is generally oval-shaped in plan configuration with the forward and rear edges thereof being slightly narrower than the central portion thereof to further facilitate turning movement in the slot. The relieved portion 124 of the slide bar 88 is of sufficient height to enable the relieved portion to engage the slot 122 being cut in the material 120 throughout the adjustment range of the foot element 90.

Also, the front surface of the cutter bar is provided with a notch 126 which extends from the lower portion of the opening 118 down to a point adjacent to but in front of the shear edge 116 to further delineate or define the shear edge.

The cutter 76 has a specific shape and configuration with the forward edge thereof having a notch 128 forming a clearance with the top edge thereof outwardly flared at 130 to merge with the forward edge of the cutter 76. The lower edge of the notch is defined by an upwardly inclined edge 132 terminating in a transverse shear edge 134 in alignment with the forward edge of the cutter 76. The surfaces of the cutter rearwardly of the notch 128 are slightly relieved as at 146 to provide clearance with the relieved portions generally forming continuations of the upper and lower limits of the notch 128. The lower limit of the relieved portion 136 on the cutter is defined by an inclined edge 138 on each surface thereof and the lower end of the cutter 76 is rounded as at 140 and also the side surfaces thereof are curved or tapered inwardly as at 142 forming a relieved lower portion extending from the front to the rear edge of the cutter but leaving generally a triangular shaped surface area 144, the rear portion of which defines the edges 138 and the forward portion which defines the side surfaces of the inclined portion 132 and the transverse shear edge 134.

The lower edge of the triangular surface area 144 below the notch 128 is effective as a deburring edge and is designated by numeral 146.

In operation, the motor drives the power shaft for rotating the drill chuck and at the same reciprocating the cutter 76 in an obvious manner. The drill chuck may be used to hold a drill for facilitating initiation of the slot in the event it is desired to cut a slot in a relatively large panel of material. Also, the drill chuck has particular utility in freeing the machine if the cutter blade 76 is run into hard or tough material and becomes jammed or stops the motor because of binding or the like. In this event, the drill chuck can be manually rotated in any direction such as a reverse direction for loosening the cutter blade and freeing the cutting machine.

Figure 12:
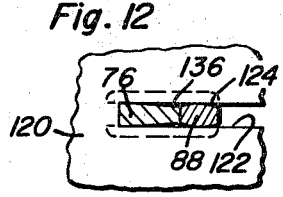
FIGURE 12 is a sectional view along section line 12—12 of FIGURE 8.

The adjustable foot 90 enables clean cuts to be made in material such as wood veneer or laminated wood paneling without tearing the wood grain. The undercut and curved surfaces 124 on the adjustable foot assembly enables curved cuts to be made and this is also facilitated by the curved undercut portion 136 on the cutter blade 76 as illustrated more particularly in FIGURE 12. The foot elements 90 also serve an additional purpose by engaging under the material 120 being cut, they aid in letting the cutting blade 76 return through the slot or cut 122 without forcing the machine up out of the cut, thereby making a smooth operating machine. Of course, the tapered and rounded lower end of the cutting blade 76 also facilitates passage of the cutter blade 76 back down through the material being cut.

The actual cutting operation is illustrated in FIGURES 4–9. In FIGURE 4, the edge 134 which may be considered a piercing edge first pierces through the material 120. Due to the piercing action of the edge 134, less force is required to operate the cutter blade. After first piercing through the material and simultaneously therewith, the edges of the inclined surface 132 shear the material along parallel edges thus making a clean cut and cuttting out uniform chips at all times. By the piercing action and the shearing action by the edges of the inclined surface 132, the inclined surface will actually urge the cutter forwardly toward the material being cut. While this is occuring, the blade is reciprocating at high speed and taking another bite and for every bite, the blade makes the machine move forward toward the cut thereby providing a self-feeding blade.

The cutting edges of the blade coact with corresponding cutting edges on the cutter bar 82. The piercing or shearing edge 134 coacts with the shearing edge 116 at the bottom edge of the notch 112 whereas the side shearing edges defined by the edges of the inclined surface 132 coact with the shearing edges 112 on the cutter bar 82. This facilitates the clean and forward moving cutting action.

There are also four cutting edges for deburring action. Two of these edges are on the cutter bar 82 and two are on the cutter 76. After the first cut is made by the cutting edge 134 and 116 and sheared back toward the rear by the backward slope of the surface 132, the second set of cutters 138 associated with the cutting edges 112 on the cutter bar 82 will debur the first cut that was made. Thus, while a second cut is being made by the cutting edges 134, 116, the edges of the inclined surface 132 mating with the edges 112, the preceding cut made will be deburred by the cutters 138 cooperating with the shear edges 122 towards the rear of the stationary cutter bar thereby leaving smooth edges on both sides of the cut.

The tapered area 142 defined by the arcuate edge 146 facilitates passage of the cutter 76 back down through the slot 122 and also facilitates turning of the cutter to cut curved slots. The upper curved end of the slot 128 matches with the outlet or port 118 when the cutter is lowered thus forming an ejector for any chips within the slot 128 thus ejecting chips out through the chip ejection port 118. Basically, the cutting assembly has ten cutting areas, cutting edge 134 at the front of the cutting blade, two cutting edges extending rearwardly and downwardly from the cutting edge 134 at the side edges of the inclined surface 132, the two cutting edges 138 forming generally continuations of the cutting edges at the side edges of the inclined surface 132 to act as deburring edges, cutting edge 116 at the front of the cutter bar, two edges 112 at the front of the cutting bar to coact with the edges of the inclined surface 132 and two cutting edges also designated as 112 at the rear of the cutting bar to cooperate with the deburring cutting edges 138.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable cutting and slitting machine comprising a housing, a cutter reciprocably mounted in said housing, means on said housing for reciprocating said cutter, said housing including a stationary cutter bar guiding said cutter, a foot supported from said housing and receiving an end portion of said cutter, the end portion of said cutter projecting outwardly from the cutter bar and guidingly associated with said foot, said cutter bar and said cutter having cooperating cutting edges for cutting a slot in material, said foot adapted to engage under the material, said cutting bar adapted to engage the material in opposed relation to the foot, said cutter reciprocating through the material and including upwardly facing cutting edges orientated in opposed relation to the cutting edges on the cutting bar for sequentially piercing, shearing and deburring the material being cut while leaving a smooth, clean cut in the material, said cutting edges on the cutter including a notch in the forward edge of the cutter, the lower edge of the notch being defined by an upwardly and forwardly inclined surface terminating in a transverse piercing edge, the side edges of the inclined surface of the notch defining downwardly and rearwardly inclined shear edges, said foot including a pair of foot elements, a slide bar mounted on the housing for adjusting the position of the foot elements for varying the spatial relation between the foot elements and the cutter bar for receiving different thicknesses of material therebetween, said slide bar being disposed behind said reciprocating cutter, said cutter and slide bar being relieved in the area received in the slot to enable the device to cut curved slots.

2. The structure as defined in claim 1 wherein said cutter bar includes a transverse shear edge in opposed relation to the piercing edge on the cutter, and parallel shear edges in opposed relation to the inclined shear edges on the cutter, said cutter having deburring edges generally forming continuations of the shearing edges thereof, said cutter bar having deburring edges generally forming continuations of the shearing edges thereof for deburring the slot formed by a preceding cutting cycle.

3. The structure as defined in claim 2 wherein the lower end of said cutter is rounded and tapered slightly to facilitate downward passage of the cutter through the slot formed in the work.

4. The structure as defined in claim 3 wherein the upper end of the notch formed in the cutter is forwardly inclined, said cutter bar having an opening above the lower edge thereof for discharge of chips cut from the material, said inclined edge at the upper end of the notch ejecting the chips through the opening.

5. The structure as defined in claim 4 wherein the means for reciprocating the cutter includes a power shaft, crank means interconnecting the power shaft and the reciprocating cutter for reciprocating the cutter, a drill chuck mounted on the power shaft for receiving drills for drilling holes and forming a handle for manually rotating the shaft for loosening the reciprocating cutter in the event it becomes jammed in the material.

6. A cutting machine comprising a housing, a cutter reciprocally mounted in said housing, a cutter bar mounted in said housing and guidingly receiving said cutter, a foot supported from said housing and receiving an end portion of said cutter, the end portion of said cutter projecting outwardly from the cutter bar and guidingly associated with said foot, said cutter bar having shear edges thereon for association with the cutter, said cutter having a transversely extending piercing cutting edge and inclined side shear edges thereon disposed in opposed relation to the shear edges on the cutter bar for initially piercing material and then shearing the material, the side walls of the cutter being relieved above the piercing and shear edges with the end portions of the relieved portion of the cutter being inclined and de-burring the edges of the material being cut, the portion of the cutter above the piercing and shearing edges being notched to receive material cut by the piercing and shearing edges, said foot adapted to engage under the material with the outer end of the cutter being guided thereby.

7. The structure as defined in claim 6 wherein said foot includes a rounded forward end and a curved surface for engaging under the material being cut, and means adjustably supporting the foot for enabling the cutter to be employed for cutting various thickness of material.

8. The structure as defined in claim 6 wherein said foot includes a slide bar mounted adjustably on the housing and forming a backing element for the edge of the cutter opposite to the edge thereof having the piercing and shear edges communicated therewith for providing a positive backing for the cutter during reciprocation thereof.

References Cited

UNITED STATES PATENTS

| 2,201,599 | 5/1940 | Trautmann | 30—228 |
| 2,750,667 | 6/1956 | Johnson | 30—241 |

FOREIGN PATENTS

| 353,813 | 7/1931 | Great Britain. |

WILLIAM FELDMAN, *Primary Examiner.*

R. V. PARKER, JR., *Assistant Examiner.*